United States Patent Office 3,288,406
Patented Nov. 29, 1966

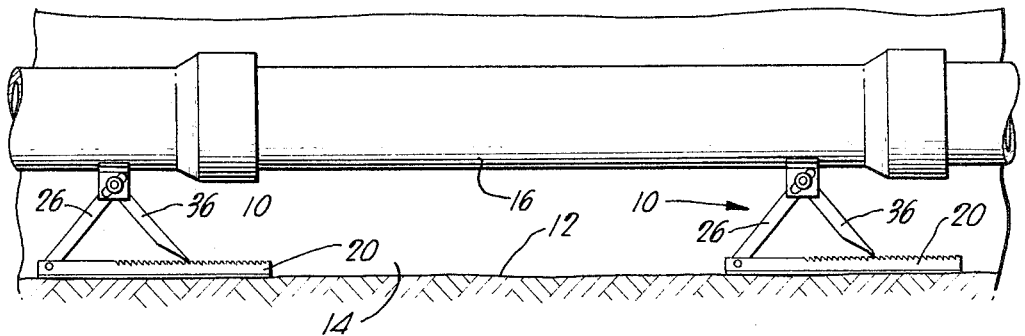
FIG_1
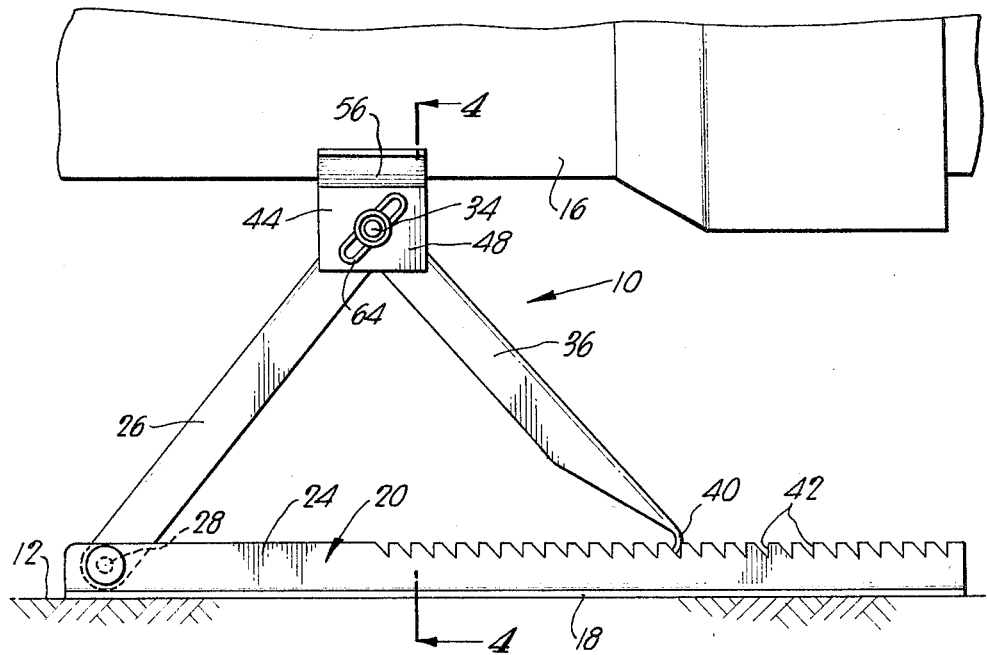
FIG_2

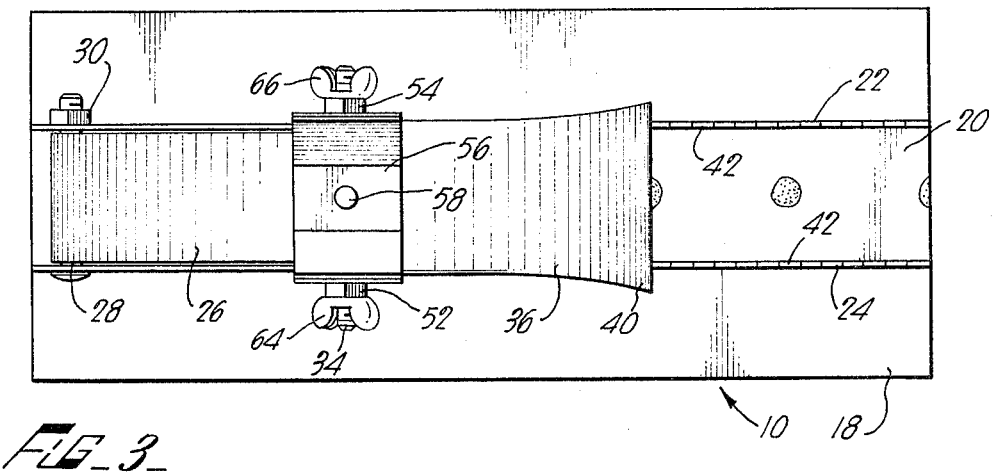
FIG_3_
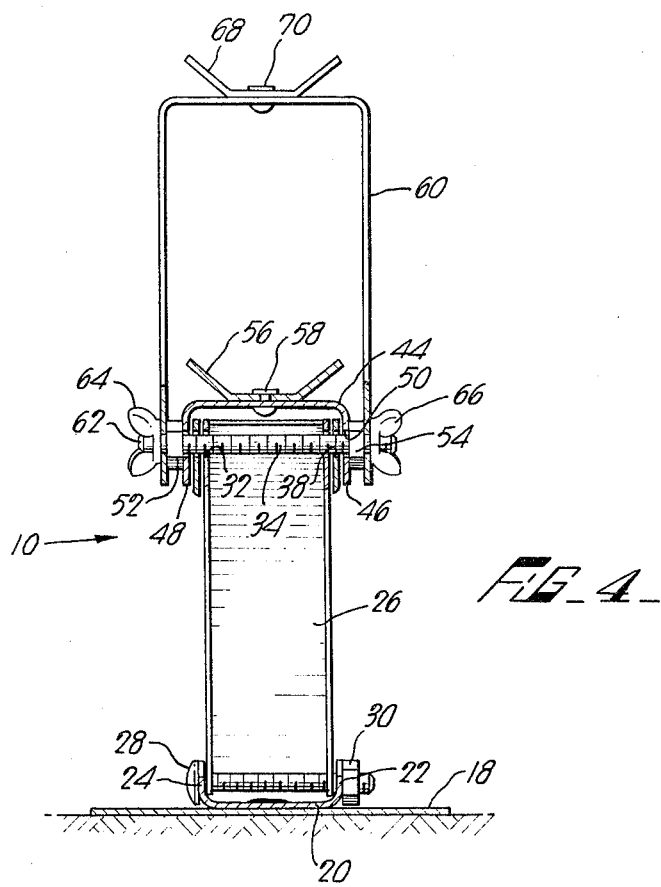
FIG_4_
INVENTOR.
GEORGE R. DEGEN
BY
Edward D. O'Brian
ATTORNEY.

3,288,406
ADJUSTABLE PIPE SUPPORT
George R. Degen, 5657 Los Alamos, Buena Park, Calif.
Filed Nov. 22, 1965, Ser. No. 508,949
6 Claims. (Cl. 248—49)

This invention is directed to an adjustable pipe support, and particularly a pipe support which is adaptable to firmly support pipes of different natures above different types of bases or foundations. The pipe support is adjustable so that variations in the level of the base with respect to parallelism to the desired pipe line are compensated for by adjustment.

Many different kinds of pipe lines must be positioned so that they are level or at a specific incline to the horizontal. Any drain line which relies upon the effects of gravity upon the fluid within the pipe must be properly laid so as to accomplish proper drainage. To properly employ the gravitational forces upon the liquid to be drained, a slight downward incline in the direction of desired flow is required in the pipe line. Presently such drain lines, when they are to be positioned underground, are simply laid in the bottom of the trench dug for them. However, variations in incline occur in the trench bottom. Thus, to have a properly aligned pipe line, blocks, stone and bricks are picked up at random and placed under the pipe line in an attempt to obtain the proper incline. However, such materials used for raising the pipe line above the trench bottom are usually not of the proper height and considerable adjustment must be made to accomplish proper inclination. Furthermore, in the case of drain lines laid within buildings or other structures, the foundation or floor which is used for their support is usually level. Again, supporting blocks are required to provide proper incline to the line and these supporting blocks again are usually not of the proper height. Furthermore, the usually random assortment of supporting blocks is unsightly.

Accordingly, it is an object of this invention to provide an adjustable pipe support structure which is useful in providing firm, rigid pipe support above the base upon which the pipe is to be supported, and to provide adjustability within the pipe support so that the pipe support properly and firmly engages the pipe to hold it at any one of a plurality of adjustable height positions.

It is a further object of this invention to provide an adjustable pipe support which is useful on any foundation and is sufficiently strong and long lived to be useful in support of a pipe which is to be filled around with soil.

It is a further object of this invention to provide an adjustable pipe support which has a large plurality of individually selectable pipe support positions and which firmly cradles the pipe.

It is a further object of this invention to provide an adjustable pipe support which is lockable in position when supporting a pipe at any one of a predetermined number of selectable heights, and in which the load of the pipe upon the pipe support locks the adjustability of the pipe support.

It is another object to provide a pipe support which is easily and quickly employed so as to save labor time.

Further objects and advantages of this invention will become apparent from a study of the following portion of this specification, the claims and the attached drawings in which:

FIG. 1 is a side elevational view showing the adjustable pipe support of this invention used in conjunction with a pipe laid adjacent the bottom of a trench;

FIG. 2 is an enlarged side elevational view thereof;

FIG. 3 is a top plan view thereof; and

FIG. 4 is a section taken generally along the line 4—4 of FIG. 2 and further including additional structure.

As an aid to understanding this invention, it can be stated in essentially summary form that it is directed to an adjustable pipe support. The pipe support of this invention has a base. Supported on the base is at least one set of a plurality of abutments. Pivoted to the base is a first link, and pivoted to the free end of the first link is a second link. The end of the second link away from the pivot is engageable against any one of the abutments. Pipe support and locking structure is provided at the pivoted juncture between the two links. The placement of the free end of the second link in different abutments places the pipe support bracket at different distances from the base. As additional structure, an additional pipe support extension bracket can be installed thereon so as to raise the top limit of support height available by the adjustable pipe support.

This invention will be understood in greater detail by reference to the following portion of this specification wherein the drawings are described. Referring now to the drawings, the adjustable pipe support of this invention is generally indicated at 10. In FIG. 1, the pipe support 10 is indicated as being in a trench having a bottom 12 and side walls, one of which is indicated at 14. The bottom 12 serves as a foundation to support pipe 16, which is spaced therefrom by means of the adjustable pipe supports 10. The bottom 12 serves as a foundation, and it may be the top of the ground, or a finished structure such as a concrete floor. It serves as a foundation upon which the pipe 16 is supported.

The pipe support 10 has a base 18 which is adapted to engage upon the foundation to support the pipe support 10 and pipe 16. Base 18 has a substantially flat bottom, and sufficient extent so as to provide proper support. As is shown particularly in FIG. 4, channel 20 is secured to base 18 with its web against base 18. Channel 20 has upstanding flanges 22 and 24 which serves as support for the upper structure. The channel 20 may be integrally formed with the base 18, or may be secured thereto by any convenient means, such as spot welding.

Link 26 serves as a first link, and is formed in the form of a channel. The lower end of link 26 has its flanges cut away, and has its web bent into circular configuration so that a pivot may pass therethrough. Pivot 28 is in the form of a bolt having nut 30 and a pivot 28 passes through suitable holes and flanges 22 and 24 as well as pivotally through the circularly bent web structure at the lower end of link 26. If preferred, the flanges of link 26 can be extended downward and not be cut away so as to provide a pivot point by holes in the flanges.

Pivot hole 32 is provided through the flanges of link 26 adjacent its upper end. Pivot 34 passes therethrough. Pivot 34 is in the form of a bolt. Link 36 is also in the form of a channel having a web and upstanding flange. Pivot hole 38 is formed in these flanges and carries pivot 34. Thus, links 26 and 36 are pivoted together and link 26 is pivoted to channel 20. Link 36 is substantially the same length as link 26, and terminates at its lower end in pawl 40. Ratchet teeth 42 are formed in the upper edges of flanges 22 and 24 and are of such size and shape as to be engageable by pawl 40. This structure defines as isosceles triangle with a channel 20 at the base, pivot 34 at the apex and links 26 and 36 at the sides. As is well known, such a structure is very rigid. Furthermore, the adjustment of the height of pivot 34 above base 18 is readily adjusted by positioning pawl 40 in selected ones of ratchet teeth 42. Thus, for a lower position, the pawl 40 is moved to one of the ratchet teeth to the right in FIG. 2. For a higher adjustment of pivot 34, the pawl 40 is moved to one of the ratchet teeth toward the left in FIG. 2. It is also seen that downward force at pivot 34 forces pawl 40 into its selected ratchet tooth 42. This urges tighter engagement and a firm structure results. It is well known that a triangular structure is very rigid, and force in the downward direction makes the juncture between pawl 40 and ratchet teeth 42 very rigid. Thus, the pivot point 34 is firmly positioned, after an adjustment has been made.

U-shaped bracket 44 has downwardly extending legs 46 and 48 which have holes 50 therein. Holes 50 are engaged around pivot 34. Preferably the pivot 34 is a bolt with nuts 52 and 54 engaged thereover for the retention of the structure in place. Thus, bracket 44 is pivotable around pivot 34 so that its top may be positioned parallel to base 18. Bracket 44 has yoke 56 secured thereon by means of pivot pin 58. Yoke 56 is pivotable on its pivot pin and is designed to support a pipe. As is indicated in FIGS. 1 and 2 yoke 56 is generally U-shaped and partially embraces a pipe placed thereon. Since yoke 56 is pivotable, the length of base 18 need not be aligned with the axis of the pipe supported, but yoke 56 can be turned so as to embrace in any orientation. Furthermore, the pivoting of bracket 44 permits the yoke 56 to properly embrace a pipe which has some inclination to it.

In use, the adjustable pipe support 10 is placed in such a position as to adequately support pipe 16. When pipe 16 is being assembled, one or more of such pipe supports 10 can be used therewith to obtain the proper pipe orientation. As the pipe becomes substantially engaged by interpipe engagement, only one such pipe support 10 is necessary for each pipe length, providing the pipe 16 has sufficient rigidity to support itself throughout its own length. The pawl 40 is placed in the appropriate ratchet tooth 42 so as to provide proper height and support for the pipe. Such adjustment is quick and accurate, so that proper pipe alignment is easily and quickly obtained. In cases where the pipe is in a trench, as is shown in FIG. 1, the pipe supports 10 are left in the trench at the time of backfill. It is well known that fresh backfilled earth does not properly support a pipe. However, the retention on these pipe supports 10 in the trench maintains the alignment until the earth can properly settle and support the pipe. This settling is accomplished long before the supports 10 fail due to their being in such a subterranean location.

An additional adjustment feature is provided to properly support pipes which are so far above the bottom 12 that they are unreachable by the normal adjustment of pipe support 10. This additional height is accomplished by attachment of an extension 60, see FIG. 4. Extension 60 is in the form of a U-shaped bracket with downwardly extending legs. The downwardly extending legs have holes 62 which are engageable over pivot 34. Manually operable wing nuts 64 and 66 are engaged upon the threads which are at least on the outer end of pivot 34. The upper end of extension 60 carries yoke 68 which is pivotally mounted on pivot 70.

In those cases when the yoke 56 cannot reach the pipe 16, because it is too high above bottom 12, extension 66 is installed by removal of wing nuts 64 and 66, placement of the extension 66 with its holes 62 engaging on pivot 34 and reinstallation and tightening of wing nuts 64 and 66. The pipe support 10 is then placed under the pipe 16 and adjusted with the yoke 68 against the pipe so that it supports the pipe at proper heights. Thus, the pipe support 10, of economic construction so that it may be left in a ditch, provides firm support over a wide range of adjustability.

This invention having been described in its preferred embodiment, it is clear that it is susceptible to numerous modifications and changes within the scope of the invention and without the exercise of the inventive faculty. Accordingly, the scope of this invention is defined by the scope of the following claims.

I claim:

1. A support, said support being adapted to support structure at any one of a plurality of selectable positions, said support comprising:

base, said base being adapted for ground engagement, first and second ends on said base, a pivot support on said base adjacent said first end thereof, a plurality of abutments on said base, said plurality of abutments extending from adjacent said second end of said base toward said first end of said base;

a first link, said first link having a pivot end and an upper end, said pivot end being pivoted to said base at said pivot support adjacent said first end of said base;

a second link, said second link having an upper end and a pawl end, a pivot pin, said pivot pin being pivotally attached to said upper end of said first link and said upper end of said second link so that said first and second links are pivoted together, said pawl being selectively engageable against any one of said abutments so that said pivot pin can be selectively positioned away from said base in a plurality of selectable positions in accordance with the engagement of said pawl against any one of said plurality of abutments;

support structure supported on said first and second links adjacent their upper ends, said support structure being adapted to support a structure at any one of a plurality of different selected distances away from said base.

2. The support structure of claim 1 wherein said support structure adjacent the upper end of each of said first and second links comprise a bracket, said bracket being engaged upon and supported by said pivot pin.

3. The support structure of claim 2 wherein said bracket has a yoke secured thereto, said yoke having upwardly directed arms so as to engage a structure to be supported.

4. The support structure of claim 3 wherein said yoke is pivoted to said bracket so that said upwardly directed arms of said yoke may be oriented in different directions with respect to said bracket, said bracket being pivoted on said pivot pin so that the orientation of said bracket with respect to said base may be adjusted.

5. The support structure of claim 4 further including an extension, said extension being pivoted on said pivot pin, said extension extending above said bracket, a further yoke pivotally attached to said extension away from its securement on said pivot pin so that the distance of said further yoke away from said base can be selected by selectively engaging said pawl against one of said abutments.

6. The support structure of claim 5 wherein said extension is secured to said pivot pin by means of wing nuts.

References Cited by the Examiner

UNITED STATES PATENTS

| 2,405,819 | 8/1946 | Dustman | 248—49 |
| 2,684,222 | 7/1954 | Miller | 248—49 |
| 2,846,168 | 8/1958 | Schroeter | 248—49 |
| 3,026,076 | 3/1962 | Bender | 248—49 |

CLAUDE A. LE ROY, *Primary Examiner.*